United States Patent
Nihei et al.

(10) Patent No.: US 8,355,817 B2
(45) Date of Patent: Jan. 15, 2013

(54) ROBOT SYSTEM

(75) Inventors: Ryo Nihei, Minamitsuru-gun (JP);
Tetsuaki Kato, Minamitsuru-gun (JP);
Takeaki Aramaki, Minamitsuru-gun (JP); Tomoyuki Yamamoto,
Minamitsuru-gun (JP)

(73) Assignee: FANUC Corporation,
Minamitsuru-gun, Yamanashi (JP)

( * ) Notice: Subject to any disclaimer, the term of this patent is extended or adjusted under 35 U.S.C. 154(b) by 133 days.

(21) Appl. No.: 13/045,763

(22) Filed: Mar. 11, 2011

(65) Prior Publication Data

US 2011/0257785 A1    Oct. 20, 2011

(30) Foreign Application Priority Data

Apr. 20, 2010    (JP) .................. 2010-097030

(51) Int. Cl.
*G05B 19/04*    (2006.01)
*G05B 19/18*    (2006.01)
*H02H 5/04*    (2006.01)
*H02H 7/08*    (2006.01)

(52) U.S. Cl. ............. 700/254; 361/23; 361/78; 901/19; 901/32; 901/49

(58) Field of Classification Search ............ 700/21, 700/143, 245–260; 901/1–50; 361/23, 78
See application file for complete search history.

(56) References Cited

U.S. PATENT DOCUMENTS

| | | | | |
|---|---|---|---|---|
| 6,208,105 B1 * | 3/2001 | Kato et al. | ............ | 318/568.24 |
| 2007/0211395 A1 * | 9/2007 | Svensson et al. | ............ | 361/23 |
| 2007/0229019 A1 * | 10/2007 | Iwashita et al. | ............ | 318/652 |
| 2008/0110259 A1 * | 5/2008 | Takeno | ............ | 73/504.12 |
| 2011/0100126 A1 * | 5/2011 | Jeong et al. | ............ | 73/514.32 |

FOREIGN PATENT DOCUMENTS

| | | |
|---|---|---|
| JP | 04002488 A | 1/1992 |
| JP | 6-91587 | 4/1994 |
| JP | 2002144260 A | 5/2002 |
| JP | 2006102889 A | 4/2006 |
| JP | 2006337197 A | 12/2006 |
| JP | 2008178959 A | 8/2008 |
| JP | 2009019898 A | 1/2009 |
| JP | 2010064232 A | 3/2010 |

* cited by examiner

*Primary Examiner* — Khoi Tran
*Assistant Examiner* — Abby Lin
(74) *Attorney, Agent, or Firm* — Drinker Biddle & Reath LLP

(57) ABSTRACT

A robot system including a robot arm driven by a servo motor; and a robot controller controlling an operation of the robot arm. The robot system further comprises a first detection section detecting a rotation amount of the servo motor; a second detection section attached to a tip portion of the robot arm, and detecting a velocity or acceleration of the tip portion of the robot arm; a computation section computing the velocity or acceleration of the tip portion of the robot arm based on values detected by the first detection section, and computing a deviation between this computed velocity or acceleration and the velocity or acceleration detected by the second detection section; and an emergency stop section for bringing the servo motor to an emergency stop when a magnitude of the deviation computed by the computation section is greater than a reference value.

3 Claims, 3 Drawing Sheets

ROBOT SYSTEM

RELATED APPLICATION DATA

This application claims priority under 35 U.S.C. §119 and/or §365 to Japanese Application No. 2010-097030 filed Apr. 20, 2010, the entire contents of which is incorporated herein by reference.

BACKGROUND OF THE INVENTION

1. Field of the Invention

The present invention relates to a robot system that detects an abnormal operation of an industrial robot.

2. Description of the Related Art

A device is conventionally known that detects acceleration and velocity of a tip portion of a robot arm and, if any of the acceleration and velocity is greater than a predetermined value, it is determined that the robot is in an abnormal state and brings the robot to an emergency stop. This device is described in Japanese Unexamined Patent Publication (kokai) No. H06-91587 (JP6-91587A).

However, when a sensor for detecting the acceleration and velocity fails, the device described in JP6-91587A cannot prevent the abnormal operation of the robot.

SUMMARY OF THE INVENTION

According to an aspect of the present invention, a robot system includes a servo motor; a robot arm driven by the servo motor; a robot controller controlling an operation of the robot arm; a first detection section detecting a rotation amount of the servo motor; a second detection section attached to a tip portion of the robot arm, and detecting a velocity or acceleration of the tip portion of the robot arm; a computation section computing the velocity or acceleration of the tip portion of the robot arm based on values detected by the first detection section, and computing a deviation between this computed velocity or acceleration and the velocity or acceleration detected by the second detection section; and an emergency stop section for bringing the servo motor to an emergency stop when a magnitude of the deviation computed by the computation section is greater than a reference value.

BRIEF DESCRIPTION OF THE DRAWINGS

The object, features and advantages of the present invention will become more apparent from the following description of embodiments taken in conjunction with the accompanying drawings, in which.

DETAILED DESCRIPTION

Figure 1:
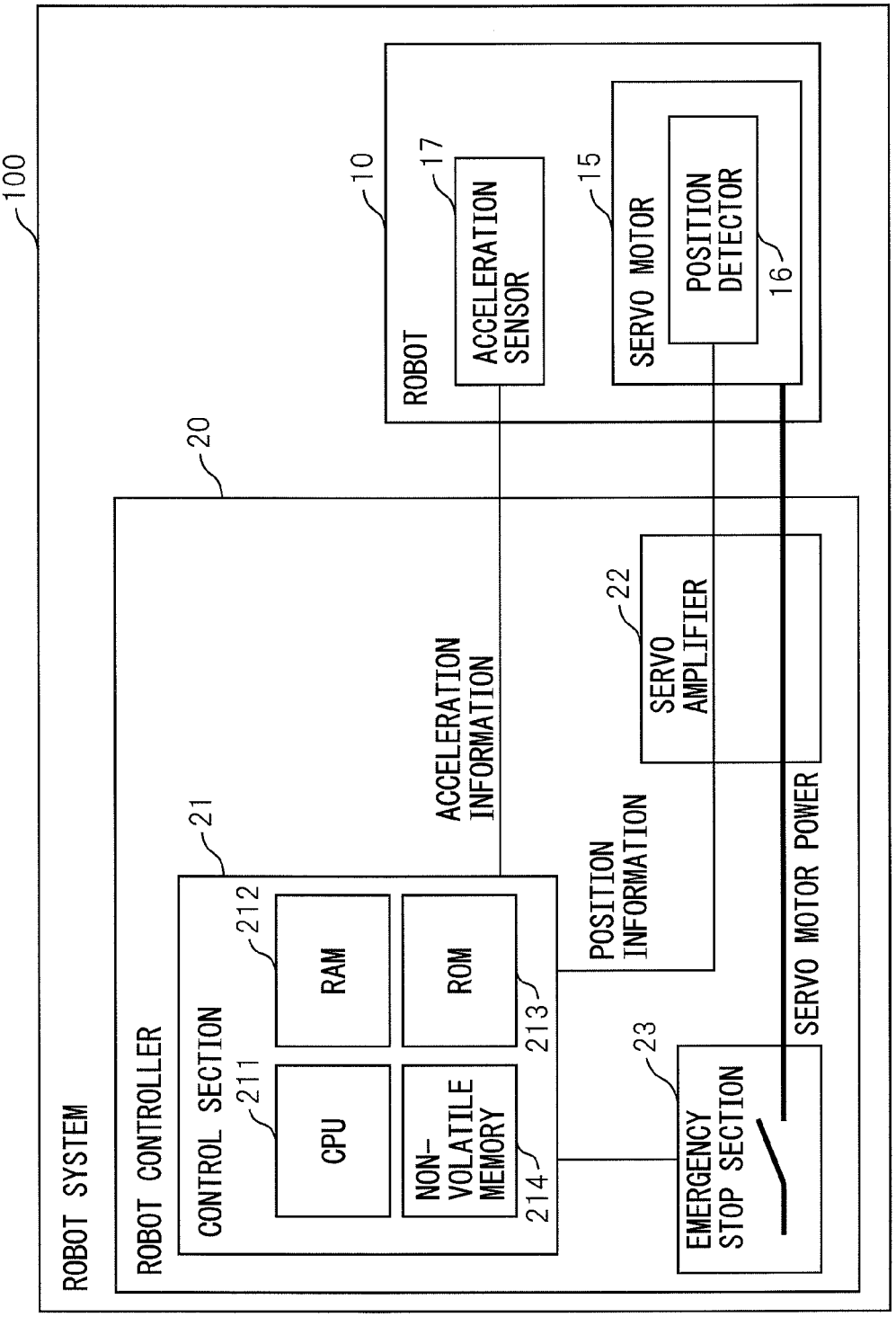
FIG. 1 is a diagram illustrating a configuration of a robot system according to an embodiment of the present invention.

Hereinafter, referring to FIGS. 1 to 3, the embodiments of the present invention will be described. FIG. 1 is a diagram illustrating a configuration of a robot system 100 according to an embodiment of the present invention. This robot system 100 includes an articulated industrial robot 10 and a robot controller 20 that controls robot 10.

Figure 2:
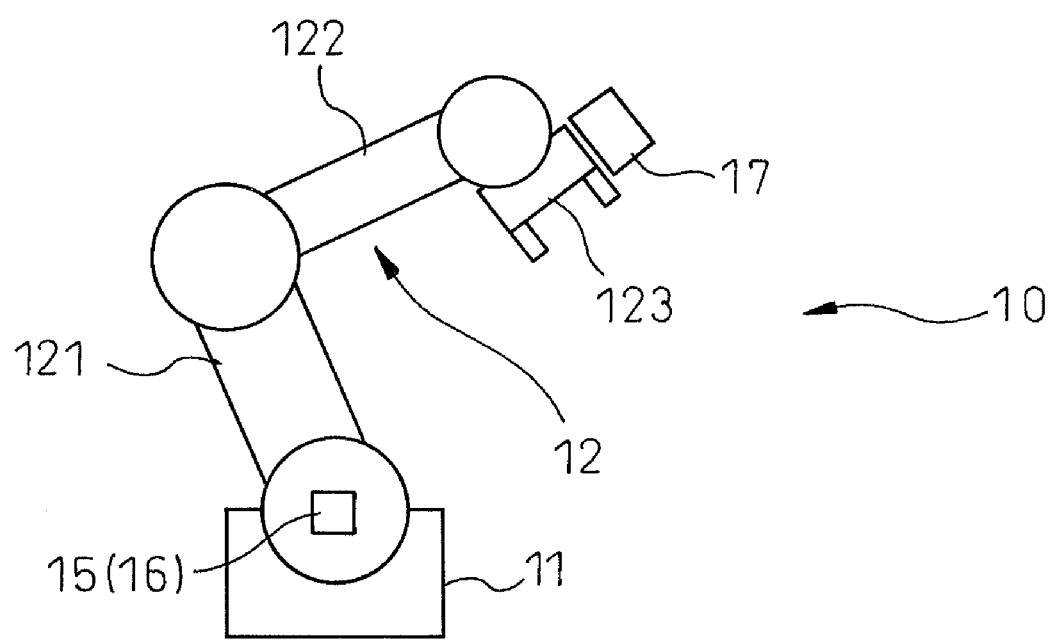
FIG. 2 is a diagram schematically illustrating a configuration of a robot of FIG. 1.

FIG. 2 is a diagram schematically illustrating a configuration of industrial robot 10. Robot 10 is a typical 6-axis vertical articulated robot, and has a base 11 fixed to a floor and a robot arm 12 that is rotatably coupled to base 11. Robot arm 12 has a lower arm 121; upper arm 122 that is rotatably coupled to a tip portion of lower arm 121; and a working device 123 (for example, a spot welding gun) that is rotatably attached to a tip portion of upper arm 122.

Robot 10 incorporates a plurality of servo motors 15 for driving the robot (only one of them is illustrated for convenience). Each servo motor 15 is provided with an encoder (also referred to as a position detector) 16 that detects an axial rotation angle of servo motor 15. The detected rotation angle is fed back to robot controller 20 (a servo amplifier 22) so that the position and orientation of working device 123 at the tip portion of the robot arm is controlled by the feedback control in robot controller 20.

A three-axis acceleration sensor 17 is attached to working device 123, so that acceleration sensor 17 can measure the accelerations at the tip portion of the robot arm in three-axis directions. Acceleration sensor 17 can measure not only a dynamic acceleration "a" while the robot arm is driven but also a static acceleration, or gravity acceleration "as" while the robot arm is stopped. The gravity acceleration "as" varies according to the orientation of the tip portion of the robot arm.

As illustrated in FIG. 1, robot controller 20 has: a control section 21; servo amplifier 22 that supplies electric power corresponding to the feedback control to servo motor 15; and an emergency stop section 23 that stops the electric power supply from servo amplifier 22. For example, emergency stop section 23 is comprised of a switch so that, when acceleration sensor 17 fails, this switch is changed so as to shut off the electric power of servo amplifier 22 to bring servo motor 15 to the emergency stop.

Control section 21 includes an arithmetic processing unit having a CPU 211, a RAM 212, a ROM 213, a non-volatile memory 214 and other peripheral circuits. Various system programs are stored in ROM 213, and various programs and predetermined values for operations of robot 10 are stored in non-volatile memory 214.

Not only the signal from acceleration sensor 17 (the acceleration information) but also the signal from position detector 16 (the position information) via servo amplifier 22 are input to control section 21. CPU 211 carries out a predetermined process based on these input signals, and outputs control signals to servo amplifier 22 and emergency stop section 23 to control their operations.

Figure 3:
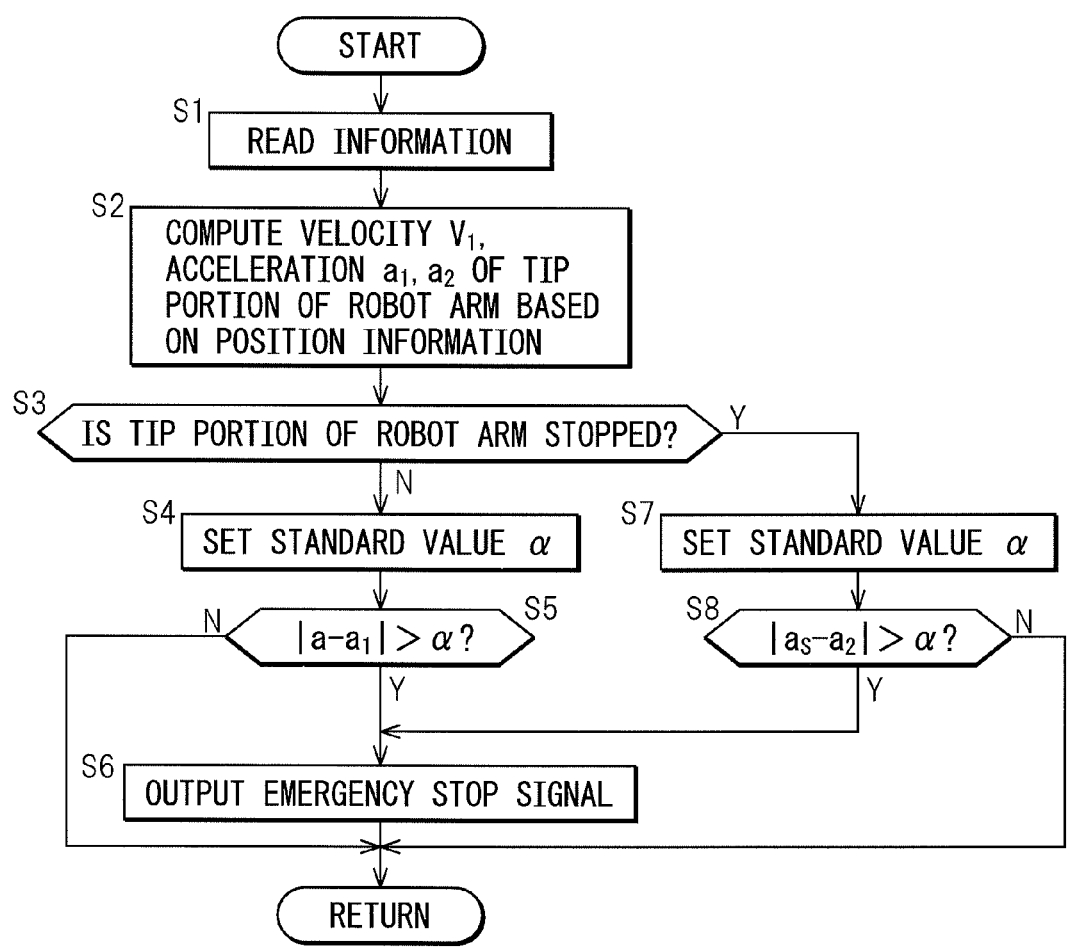
FIG. 3 is a flowchart illustrating an example of a process carried out in a control section of FIG. 1.

FIG. 3 is a flowchart illustrating an example of a process carried out by CPU 211. The process illustrated in this flowchart is started, for example, by switching on robot controller 20. In step S1, the acceleration information from each acceleration sensor 17 and the position information from each position detector 16 are read. The acceleration information includes the dynamic acceleration "a" and the gravity acceleration "as".

In step S2, based on the position information from position sensor 16, a velocity v1, a dynamic acceleration a1 and gravity acceleration a2 of the tip portion of the robot arm, or the position to which acceleration sensor 17 is attached are computed. The velocity v1 can be obtained by calculating a coordinate position of the tip portion of the robot arm for every predetermined time periods and differentiating them with respect to time. The acceleration a1 can be obtained by further differentiating the velocity v1 with respect to time. The gravity acceleration a2 can be obtained by determining the orientation (inclination) at the attachment point of acceleration sensor 17. Hereinafter, the accelerations "a" and "as" obtained based on the acceleration information may be also referred to as the detected acceleration and the detected gravity acceleration, respectively, and the accelerations a1 and a2 obtained based on the position information may be also referred to as the computed acceleration and computed gravity acceleration, respectively.

In step S3, based on the computed velocity v1, it is determined whether the tip portion of the robot arm is stopped or not. For example, if the velocity v1 is equal to or smaller than a predetermined value, it is determined that the tip portion of the robot arm is stopped. In step S3, if it is determined that the tip portion of the robot arm is not stopped, the process proceeds to step S4.

In step S4, a reference value α which is a criterion for determining a failure of acceleration sensor 17 is set. In this case, a relationship in which as the velocity v1 decreases, the reference value α also decreases is stored in the memory in advance and, by using this relationship, the reference value α according to the velocity v1 is set. The relationship that as the velocity v1 increases, the reference value α reduces linearly or decreases in a step-wise manner, as the relationship between the velocity v1 and the reference value α, may be stored in the memory.

In step S5, a deviation (a−a1) between the detected acceleration "a" and the computed acceleration a1 is computed and it is determined whether its magnitude (the absolute value) is greater than the reference value α or not. If an affirmative decision is made in step S5, the process proceeds to step s6 and, if a negative decision is made in step S5, the process passes step S6 and returns.

In step S6, a emergency stop signal is output to emergency stop section 23 to shut off the electric power of servo amplifier 22. As a result, the emergency stop of each servo motor 15 for driving each robot arm is carried out and the operation of robot 10 is stopped.

On the other hand, in step S3, once it is determined that the tip portion of the robot arm is stopped, the process proceeds to step S7. In step S7, based on the relationship between the velocity v1 and the reference value α stored in the memory in advance, the reference value α at the time of stop of the robot arm is set.

In step S8, a deviation (as−a2) between the detected gravity acceleration "as" and the computed gravity acceleration a2 is computed and it is determined whether its magnitude (the absolute value) is greater than the reference value α set in step S7 or not. If an affirmative decision is made in step S8, the process proceeds to step S6 and, if a negative decision is made in step S8, the process returns.

The operation of the robot system according to this embodiment can be summarized as follows. During the operation of robot arm 12, the deviation between the detected acceleration "a" detected by acceleration sensor 17 and computed acceleration a1 computed by using the signal from position detector 16 is computed, and it is determined whether the magnitude of the deviation is greater than the reference value α or not (step S5). If the deviation is equal to or less than the reference value α, there is no abnormality in the detection value of the acceleration sensor 17 and, consequently, control section 21 does not output the emergency stop signal.

On the other hand, if the magnitude of the deviation between the detected acceleration "a" and the computed acceleration a1 is greater than the reference value α, the emergency stop signal is output to emergency stop section 23 to shut off the electric power of servo amplifier 22 (step S6). As a result, when acceleration sensor 17 is failed, the operation of robot 10 can be stopped. Thus, an abnormal operation of robot 10 during the failure of the sensor can be prevented before it occurs. In this case, as the velocity v1 of the tip portion of the robot arm is smaller, the reference value α is also made smaller. Thus, when the tip portion of the robot arm operates slowly, the failure of sensor 17 can be detected more accurately.

When robot arm 12 is stopped, the deviation between the detected gravity acceleration "as" detected by acceleration sensor 17 and the computed gravity acceleration a2 computed by using the signal from position detector 16 is computed, and it is determined whether the magnitude of the deviation is greater than the reference value α or not (step S8). If the deviation is greater than the reference value α, the emergency stop signal is output to emergency control section 23 to shut off the electric power of servo amplifier 22 (step S6). Consequently, even when the robot arm is stopped, the abnormal operation of robot 10 due to the failure of the sensor can be reliably prevented.

According to this embodiment, the following effects can be exhibited:

(1) During the operation of robot arm 12, the acceleration a1 of the tip portion of the robot arm is computed by using the signal from position detector 16. If the deviation between this computed acceleration a1 and the detected acceleration "a" detected by acceleration sensor 17 is larger than the reference value α, the emergency stop of servo motor 15 is carried out. As a result, the abnormal operation of robot 10 due to the failure of the sensor can be obviated. More specifically, before the abnormal operation of robot 10 occurs, the emergency stop of robot 10 can be carried out. Thus, it is preferable in view of safety.

(2) When robot arm 12 is stopped, the orientation of the tip portion of the robot arm is determined by using the signal from position detector 16, and the gravity acceleration a2 of the tip portion of the robot arm is computed. If the magnitude of the deviation between this computed gravity acceleration a2 and the detected gravity acceleration "as" detected by acceleration sensor 17 is greater than the reference value α, the emergency stop of servo motor 15 is carried out. As a result, even when the robot arm is stopped, the abnormal operation of robot 10 due to the failure of the sensor can be prevented before it occurs.

(3) The velocity v1 of the tip portion of the robot arm is computed by using the signal from position detector 16, and as this velocity v is smaller, the reference value α is also made smaller. As a result, when the tip portion of the robot arm operates at a slow speed, the failure of acceleration sensor 17 can be detected more accurately.

Though the rotation amount of servo motor 15 is detected by position detector (encoder) 16 in the embodiment described above, position detector 16 as a first detection section may be configured in any way. Though the dynamic acceleration "a" and gravity acceleration "as" of the tip portion of the robot arm is detected by acceleration sensor 17, the velocity v of the tip portion of the robot arm may be detected based on the acceleration information from acceleration sensor 17. As long as the second detection section is attached to the tip portion of the robot arm and detects any of the velocity v, dynamic acceleration "a", and gravity acceleration "as" of the tip portion of the robot arm, a second detection section is not limited to acceleration sensor 17. For example, a gyro sensor, inertial sensor and the like may be used as the second detection section.

In the embodiment described above, the acceleration a1 of the tip portion of the robot arm is computed by using the signal from position detector 16 and the deviation (acceleration deviation) between the computed acceleration a1 and the detected acceleration "a" is computed. However, the configuration of control section 21 as a computation section is not limited to that described above. For example, when the velocity v of the tip portion of the robot arm is detected as described above, a deviation (velocity deviation) between the velocity (computed velocity) v1 computed by using the signal from position detector 16 and the detected velocity v may be computed. In this case, when the magnitude of the velocity deviation is greater than a reference value, the emergency stop of servo motor 15 may be carried out by the signal from control section 21.

The electric power of servo amplifier 22 is shut off by switching emergency stop section 23. However, as long as the emergency stop of servo motor 15 is carried out when the magnitude of the velocity deviation or the acceleration deviation is greater than the reference value, a emergency stop section may be configured in any way. In the embodiment described above, the reference value α for determining the failure of the sensor is set according to the velocity v1 of the tip portion of the robot arm computed by using the signal from the position detector 16. However, the reference value α may be set according to the computed orientation or the accelerations a1 or a2 of the tip portion of the robot arm.

According to the present invention, the velocity or acceleration of the tip portion of the robot arm is computed based on the detected value of the rotation amount of the servo motor, and the emergency stop of the servo motor may be carried out according to the deviation between this velocity or acceleration and the actually detected velocity or acceleration. As a result, even if the sensor for detecting the velocity or acceleration fails, the abnormal operation of the robot can be reliably prevented.

While the present invention has been described with reference to the preferred embodiments thereof, it will be understood, by those skilled in the art, that various modifications and changes may be made thereto without departing from the scope of the appended claims.

The invention claimed is:

1. A robot system, comprising:
   a servo motor;
   a robot arm driven by the servo motor;
   a robot controller controlling an operation of the robot arm;
   a first detection section detecting a rotation amount of the servo motor;
   a second detection section attached to a tip portion of the robot arm, and detecting a velocity or acceleration of the tip portion of the robot arm;
   a computation section computing the velocity or acceleration of the tip portion of the robot arm based on values detected by the first detection section when the robot arm is driven, and computing a deviation between this computed velocity or acceleration and the velocity or acceleration detected by the second detection section when the robot arm is driven; and,
   an emergency stop section for bringing the servo motor to an emergency stop when a magnitude of the deviation computed by the computation section is greater than a reference value,
   wherein the acceleration detected by the second detection section has a sensor for detecting gravity acceleration when the robot is stopped,
   wherein the computation section computes gravity acceleration of the tip portion of the robot arm based on the values detected by the first detection section when the robot arm is stopped, and computes a deviation between this computed gravity acceleration and the gravity acceleration detected by the second detection section, and
   wherein the emergency stop section brings the servo motor to an emergency stop when a magnitude of the deviation of the gravity acceleration computed by the computation section is greater than the reference value.

2. A robot system according to claim 1, wherein the reference value is set according to a position, a velocity or acceleration of the tip portion of the robot arm computed based on the values detected by the first detection section.

3. A robot system according to claim 1, wherein the second detection section has at least any of a gyro sensor, an acceleration sensor and an inertial sensor.

* * * * *